(12) United States Patent
McClain et al.

(10) Patent No.: US 9,639,185 B2
(45) Date of Patent: May 2, 2017

(54) TRACKBALL INPUT DEVICE WITH ADDITIONAL ROCKING MOTION

(71) Applicants: Volkswagen AG, Wolfsburg (DE); Audi AG, Ingolstadt (DE)

(72) Inventors: Megan McClain, San Francisco, CA (US); Aaron Rudolph, Montara, CA (US); Ulrich Mueller, Sunnyvale, CA (US); Heiko Maiwand, Foster City, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 629 days.

(21) Appl. No.: 13/838,489

(22) Filed: Mar. 15, 2013

(65) Prior Publication Data
US 2014/0267041 A1 Sep. 18, 2014

(51) Int. Cl.
*G06F 3/033* (2013.01)
*G06F 3/0354* (2013.01)
(52) U.S. Cl.
CPC ................................. *G06F 3/03549* (2013.01)
(58) Field of Classification Search
CPC ...... G06F 3/033; G06F 3/0312; G06F 3/0213; G06F 3/0354; G06F 3/03541; G06F 3/03549
See application file for complete search history.

(56) References Cited

U.S. PATENT DOCUMENTS

| | | | | |
|---|---|---|---|---|
| 5,914,705 A | * | 6/1999 | Johnson et al. | 345/163 |
| 7,623,116 B1 | * | 11/2009 | Bidiville | 345/163 |
| 2002/0000971 A1 | * | 1/2002 | Armstrong | 345/156 |
| 2004/0174336 A1 | * | 9/2004 | Bohn | G06F 3/0312 345/156 |
| 2006/0001657 A1 | * | 1/2006 | Monney et al. | 345/184 |
| 2009/0066651 A1 | * | 3/2009 | Griffin et al. | 345/167 |
| 2009/0135029 A1 | * | 5/2009 | Ladouceur et al. | 341/23 |
| 2009/0160775 A1 | * | 6/2009 | Vanden Heuvel | 345/167 |

FOREIGN PATENT DOCUMENTS

EP 2 261 773 A1 12/2010

* cited by examiner

*Primary Examiner* — Ilana Spar
*Assistant Examiner* — Nguyen H Truong
(74) *Attorney, Agent, or Firm* — Muncy, Geissler, Olds & Lowe, P.C.

(57) ABSTRACT

A system includes a graphical user interface and a trackball device configured to provide controlling input to the graphical user interface. The trackball device includes a trackball configured to allow a rocking motion along an axis of the trackball.

15 Claims, 6 Drawing Sheets

TRACKBALL INPUT DEVICE WITH ADDITIONAL ROCKING MOTION

BACKGROUND OF THE INVENTION

Field of the Invention

The present invention relates to a trackball input device for a display and, more particularly, to a trackball input device with additional rocking movements.

Description of the Background Art

Trackballs have long been used as input elements for scrolling through lists by restraining the ball's rotation about a given axis. Typically, the horizontal axis is locked for vertical lists and the vertical axis is locked for horizontal lists. Changing the locked axis allows the user to scroll through the type of list shown in the current state of a graphical user interface.

EP 2261773 discloses a conventional trackball mechanism. A depressible navigation trackball is mounted within a socket. The trackball includes a directional positioning mechanism arranged such that the navigation trackball is in communication with the directional positioning mechanism in the depressed configuration. The directional positioning mechanism urges the navigation trackball in one of at least two predetermined directions when the navigation trackball is in the depressed configuration. The trackball allows a user to scroll through a menu and select items in the menu by depressing the trackball.

A conventional trackball, like that disclosed in EP 2261773, has, at most, two distinct mechanical actions when locked on any axis. First, it can rotate about the locked axis (i.e., scrolling motion). Second, it can be depressed (i.e., selecting motion). The user can scroll through lists using the rotation and move further into a hierarchy by pushing down to select.

The conventional trackballs, however, do not have the ability to go back or move out of the hierarchy through a distinct mechanical action. Accordingly, external buttons or specific navigation-relevant list-items must be included in the system to navigate out of the current list. For example, there must be a separate "back" button or a place in the list where the user can choose "back" by using the same down-press to select. The restrained trackball lacks the ability to elegantly navigate through these hierarchies or contexts without needing supplemental input elements or inputs.

Certain conventional designs attempt to circumvent the above problem by allowing selection of the navigation-relevant "back" item within a list (using the down-click/press) and/or having a button separate from the trackball that allows the user to "back."

There are currently no trackball input devices that allow a user to navigate out of a menu (i.e., go "back") using only the trackball without additional mechanisms.

SUMMARY OF THE INVENTION

In view of the foregoing and other exemplary problems, drawbacks, and disadvantages of the conventional methods and structures, an exemplary feature of the present invention is to allow a user to navigate the entire system using only the trackball, moving both into and out of contexts/menus more seamlessly.

In accordance with a first exemplary, non-limiting aspect of the present invention, a trackball device includes a trackball configured to allow a rocking motion along a locked axis of the trackball.

In accordance with a second exemplary, non-limiting aspect of the present invention, a system includes a graphical user interface and a trackball device configured to provide controlling input to the graphical user interface. The trackball device includes a trackball configured to allow a rocking motion along an axis of the trackball.

In accordance with a third exemplary, non-limiting aspect of the present invention, a console includes a console surface, a trackball device mounted within the console surface, the trackball device comprising a trackball configured to allow a rocking motion along an axis of the trackball and a graphical user interface. The trackball device is configured to provide controlling input to the graphical user interface.

Accordingly, the present invention allows a user to move forward and backward through the hierarchy without having to use external buttons or without having to scroll to a specific place within a list, as is the case with selecting the "back" item. Instead, the present invention provides the user an additional mechanical action that can be used to input this "back" command. The user can initiate this command to the system, independent of the position within the list. There is no conventional technology that implements the above features of the present invention.

BRIEF DESCRIPTION OF THE DRAWINGS

The present invention will become more fully understood from the detailed description given hereinbelow and the accompanying drawings which are given by way of illustration only, and thus, do not limit the present invention, and wherein.

DETAILED DESCRIPTION

Figure 1:
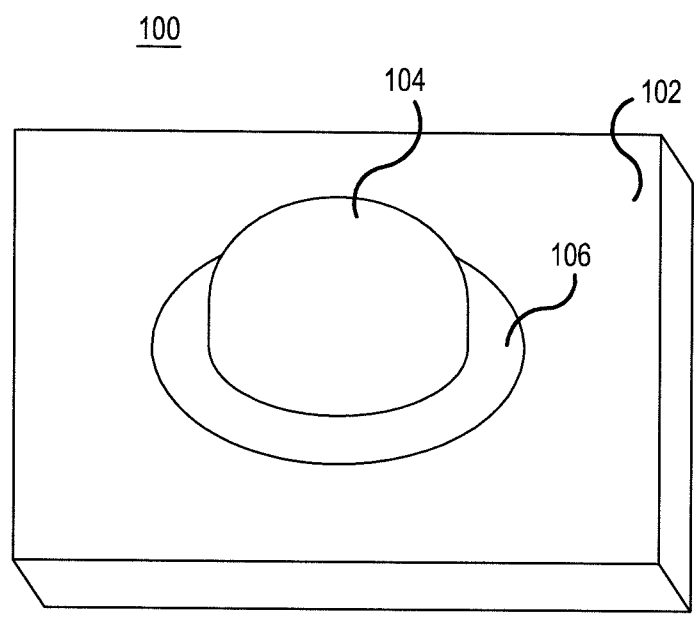
FIG. 1 illustrates a trackball device 100 according to an exemplary embodiment of the present invention.

Referring now to the drawings, and more particularly to FIGS. 1-5, there are shown exemplary embodiments of the method and structures according to the present invention.

FIG. 1 illustrates a trackball device 100 according to certain exemplary embodiments of the present invention. The device 100 includes a housing 102 having an O-ring 106 formed within an opening in the housing 102. A trackball 104 is rotationally, movably received within the opening.

According to certain exemplary aspects of the invention, the trackball device 100 can control an entire interaction with a graphical user interface (GUI) more elegantly and using only the trackball 104. No external buttons are required. Indeed, as is illustrated in FIG. 1, the trackball device 100 is devoid of any additional buttons outside of the trackball 104. Furthermore, there is not need to scroll to a certain position in a list to go "back." Indeed, every user directive is input with a distinct, mechanical movement of the trackball 104.

Figure 2A:
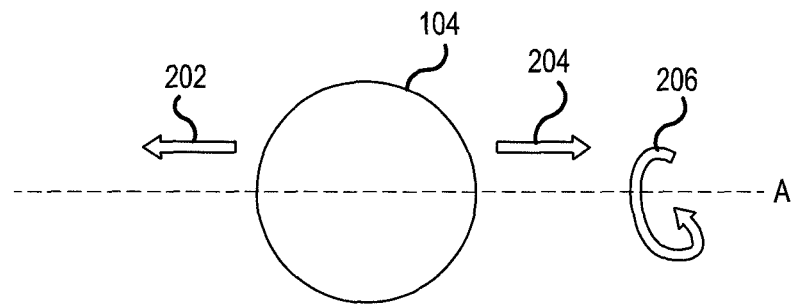
FIGS. 2A and 2B illustrates a top view of the trackball 100 and an associated graphical user interface 210 according to an exemplary embodiment of the present invention.

FIG. 2A is a top view of the track ball and an associated GUI illustrating the mechanical methods for interacting with the trackball device 100 illustrated in FIG. 1. When the trackball 104 is locked along an axis, the user has the ability to scroll through lists on the GUI, by rotating the ball about the axis; select, by depressing on the trackball 104 when a desired item is highlighted in a list; and rock the ball along its axis.

In the embodiment illustrated in FIG. 2A, the trackball 104 is locked along the horizontal axis A, allowing the user to be able to scroll vertically through the GUI's vertical list of items 218 via rotation (shown with arrow 206). The manner in which the trackball 104 is locked is detailed further below with reference to FIGS. 3A-3C. The locking of the trackball 104 is achieved via a locking mechanism 110 that either contacts (locked) or does not contact (unlocked) the trackball 104. The locking mechanism 110 includes a piece that touches the trackball 110b and a rotary encoder 110a. The rotary encoder allows the trackball 104 to still spin about the axis of the encoder (action 206) when the locking mechanism is in contact with the trackball 104. As is illustrated in FIG. 2A, the trackball 104 is associated with a GUI 210. The GUI may include, for example, a display in an automobile console.

In the exemplary embodiment illustrated in FIG. 2A, the GUI displays a plurality of contexts/menus 214. A selected context/menu 212 is fully displayed such that items 218 in the context/menu are displayed on the display screen 216 of the GUI 210. The trackball 104 is configured to allow a user to scroll through the menu items 218 by rotating the trackball 104 about the locked axis A of the trackball, as illustrated by arrow 206 in FIG. 2. Once the user has identified a desired item, the user stops the scrolling motion resulting in one of the items being highlighted 220. The trackball 104 is configured to allow a user to press the trackball downward to select the highlighted item 220.

Figure 2B:
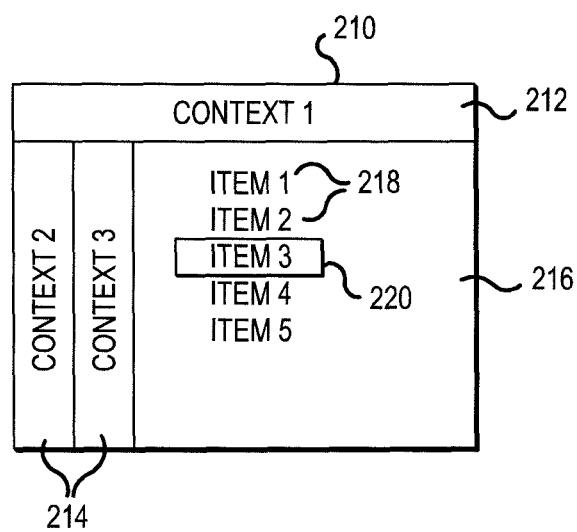

The axis of interaction can also change contextually based on the GUI. A user can select items through a list that is horizontally arranged as in screen 216. Selecting a highlighted item provides the ability to bring up a selection window that is arranged in the opposite orientation 222 (as illustrated in FIG. 2B). The axis of rotation 206 now shifts 90 degrees to now align with the former rocking axis. Now, scrolling the trackball in the new orientation moves the on-screen cursor, 224, perpendicularly to the previous orientation. Rocking along the new axis returns the user to the previous state seen in the touch screen 216

Additionally, the trackball device 100 of the present invention provides a third, rocking motion. The rocking motion is a rotation of the trackball 104 and platform in which it sits, along the axis perpendicular to the locked axis A, as illustrated by arrows 202 and 204. The rotation, however, is limited to a motion only through a certain small number (e.g. 5 degrees) of degrees, at which point the trackball 104 encounters a mechanical limitation to the motion and collides with a button that can be clicked.

Figure 3A:
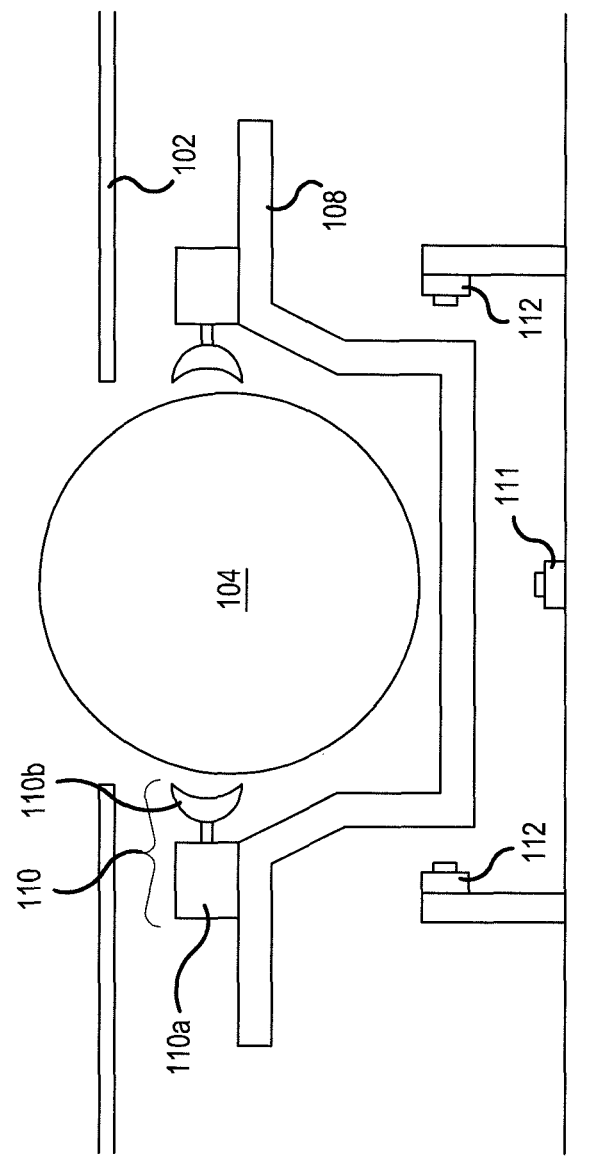
FIGS. 3A-3C illustrate a cross-sectional view of the trackball device 100 illustrated in FIG. 1.
Figure 3B:
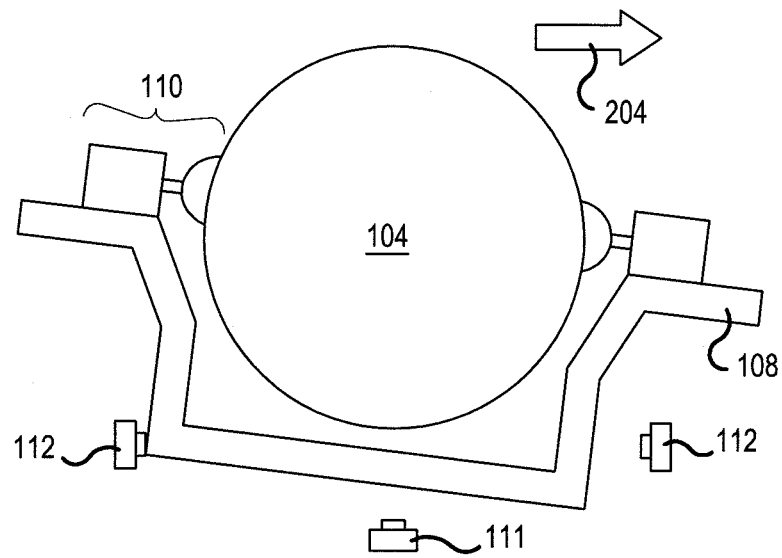
Figure 3C:
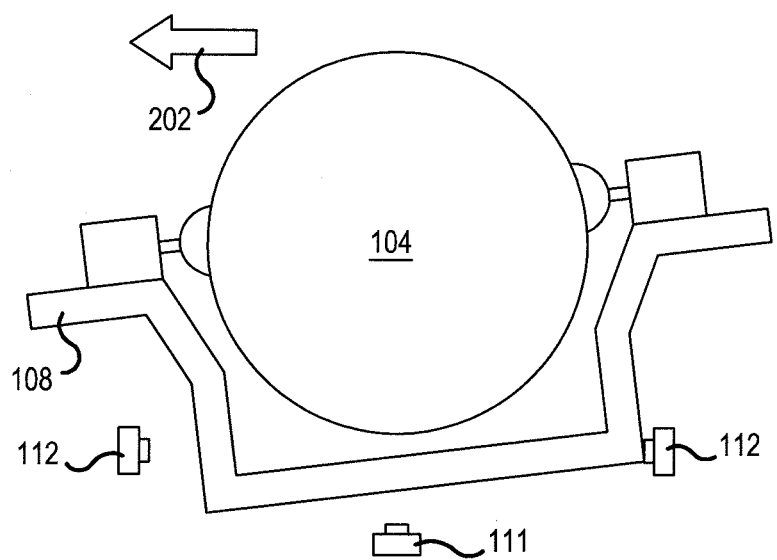

The rocking is achieved by rotating the entire platform 108 in which the trackball sits (as illustrated in FIGS. 3A-3C). When the locking mechanisms 110 are engaged, the trackball 104 is rigidly connected to the platform along this axis. Therefore, an attempt to spin the trackball 104 along this locked axis will cause the entire platform 108 to rotate. The base of the platform 108 will then come into contact with one of the side click buttons 112, creating the rocking click.

Rocking (or clicking) in a first direction 202 allows a user to go "back" from the displayed menu/context 212 to one of the other contexts 214. The user may go "back" from anywhere within the list. That is, the user does not have to scroll to a "back" icon to select the "back" motion. Additionally, rocking in a second direction 204 also allows a user to select the highlighted item 220.

FIGS. 3A-3C illustrate a cross-sectional view of the trackball device 100 illustrated in FIG. 1. The trackball 104 is positioned within the opening of the housing 102 on a suspended platform 108. FIG. 3A illustrates an initial position of the trackball 104. The rocking inputs are achieved by suspending the platform 108 and allowing it to rotate along the locked axis. When the trackball 104 is rocked, the entire platform tilts due to its connection to the platform via the locking mechanisms 110 FIG. 3B illustrates the trackball 104 being rocked in the selecting direction 204, illustrated in FIG. 2. FIG. 3C illustrates the trackball 104 being rocked in the "back" direction 202 illustrated in FIG. 2. Because the platform 108 is being tilted along the locked axis, the ball cannot spin freely, as it is able to do when rotated about the locked axis. This is achieved through the use of a locking mechanism 110 in the form of two actuated plungers 110b with attached rotary encoders 110a. These plungers 110b engage the ball and constrain the rolling to a single axis that is orthogonal to the direction of tilt. Rolling the ball in this axis is allowed, and is augmented with detent haptic feedback of the rotary encoders 110a. Tilting in each direction along the axis creates a "click". Therefore, two additional "clicks" are present on each axis when it is locked. This click is provided by a hard stop in the form of a tactile switch 112, which is engaged at the extreme limit of travel. These additional "clicks" are separate from the down-click (depression) used to select items 218 in the list. The down-click is provided by an additional tactile switch 111 that is engaged when the ball is depressed. "Rocking" along the locked axis A in one direction allows the user to move further into the list hierarchy by selecting an item and rocking along the axis in the other direction (180 degrees opposite to the first direction) allows the user to move "back" out of the list and further up the hierarchy.

Figure 4:
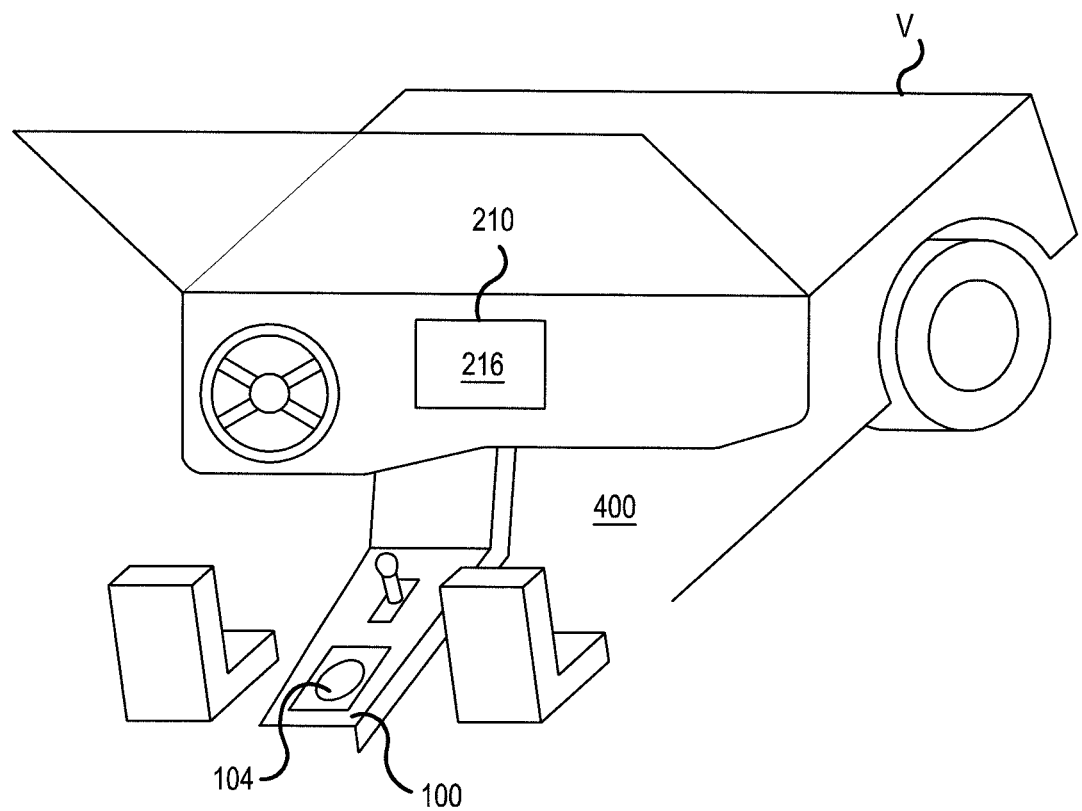
FIG. 4 illustrates a console system 400 incorporating the trackball device 100 according to an exemplary embodiment of the present invention.

FIG. 4 illustrates a console system 400 incorporating the trackball device 100. As is illustrated in FIG. 4, the console system 400 is incorporated into a passenger compartment of a vehicle V. The console system 400 includes the graphical user input 210 and the display screen 216 in combination with the trackball device 100. The trackball device 100 may be installed at a center console between the driver and passenger seats in the passenger compartment of the vehicle, for example. Accordingly, the user may control the GUI 210 easily without looking down at the trackball device 100. It is noted, however, that the placement of the GUI and the trackball device 100 are not limited to the specific, exemplary configuration illustrated in FIG. 4. It is also noted that the trackball 104 may be incorporated directly into the console without the housing 102, whereby the console itself acts the housing supporting the trackball 104.

Figure 5:
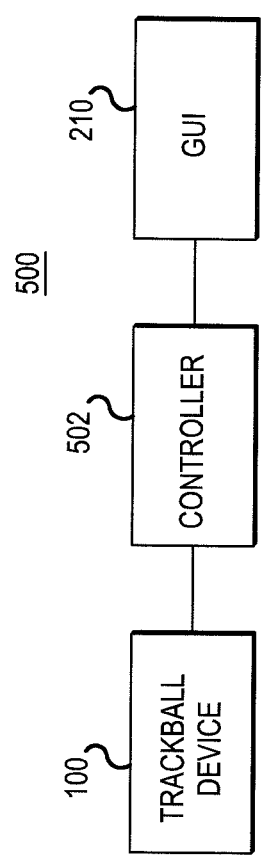
FIG. 5 illustrates a block diagram of a system 500 incorporating the trackball device 100 according to an exemplary embodiment of the present invention.

FIG. 5 illustrates a block diagram of a system 500 incorporating the trackball device 100 according to an exemplary embodiment of the present invention. The system 500 includes the trackball device 100, the GUI 210, and a controller 502 configured to transmit a signal from the trackball device 100 to the GUI 210 upon a movement of the trackball 104. The controller 502 is configured to detect and interpret the specific motion of the trackball 104 (e.g., scrolling, rocking, pressing) and transmit a corresponding signal to the GUI 210 to control the input provided to GUI 210. The controller 502 may include a specifically configured computer processor or may be incorporated into the overall computer system of the vehicle V.

It is not that the present invention is described in the context of a vehicle console display system. The trackball 104 and trackball device 100 described above, however, may be used in any suitable environment. For example, the trackball device may be incorporated into an electronic device (e.g., mobile telephone, laptop computer, etc.).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A trackball device comprising:
a trackball;
a locking mechanism configured to lock the trackball along an axis; and
a tiltable suspended platform supporting the trackball,
wherein the trackball is configured to allow three different motions, the three different motions comprising a pressing motion, a rocking motion along the locked axis of the trackball, and a rotation motion about the locked axis of the trackball,
wherein the trackball device is configured to provide controlling input to a graphical user interface, and
wherein, upon rocking the trackball along the axis, the graphical user interface is configured to revert back to a previous item displayed on the graphical user interface.

2. The trackball device according to claim 1, wherein the trackball device is devoid of any buttons disposed around the trackball.

3. The trackball device according to claim 1, wherein the axis comprises a horizontal axis.

4. The trackball device according to claim 1, wherein the locking mechanism comprises:
a rotary encoder; and
an engagement member configured to engage an outer surface of the trackball.

5. The trackball device according to claim 1, wherein the platform is configured to tilt along the locked axis.

6. The trackball device according to claim 5, further comprising:
a tactile switch disposed below the platform configured to detect the pressing motion of the trackball.

7. The trackball device according to claim 5, further comprising:
a tactile switch disposed adjacent a side of the platform configured to detect the rocking motion of the trackball.

8. The trackball device according to claim 5, wherein the locking mechanism comprises:
a rotary encoder disposed on a surface of the tiltable platform; and
a plunger attached to the rotary encoder, the plunger configured to engage an outer surface of the trackball and to restrain rolling of the trackball to a single axis.

9. A system comprising:
a graphical user interface; and
a trackball device configured to provide controlling input to the graphical user interface, the trackball device comprising:
a trackball;
a locking mechanism configured to lock the trackball along an axis; and
a tiltable suspended platform supporting the trackball,
wherein the trackball is configured to allow three different motions, the three different motions comprising a pressing motion, a rocking motion along the locked axis of the trackball, and a rotation motion about the locked axis of the trackball, and
wherein, upon rocking the trackball along the axis, the graphical user interface is configured to revert back to a previous item displayed on the graphical user interface.

10. The system according to claim 9, wherein the trackball device is devoid of any buttons disposed around the trackball.

11. The system according to claim 9, wherein the graphical user interface is configured to display a plurality of menus, the menus listing selectable items.

12. The system according to claim 11, wherein, when the trackball is locked along the axis, the trackball is configured to input a scrolling input by allowing rotation of the trackball about the axis.

13. The system according to claim 11, wherein, when the trackball is depressed, the trackball enters a selection input to select a highlighted one of the selectable items.

14. The system according to claim 9, wherein the platform is configured to tilt when the trackball is rocked along the axis.

15. A console comprising:
a console surface;
a trackball device mounted within the console surface, the trackball device comprising:
a trackball;
a locking mechanism configured to lock the trackball along an axis, wherein the trackball is configured to allow three different motions, the three different motions comprising a pressing motion, a rocking motion along the locked axis of the trackball, and a rotation motion about the locked axis of the trackball; and
a tiltable suspended platform supporting the trackball; and
a graphical user interface,
wherein the trackball device is configured to provide controlling input to the graphical user interface, and
wherein, upon rocking the trackball along the axis, the graphical user interface is configured to revert back to a previous item displayed on the graphical user interface.

\* \* \* \* \*